Oct. 16, 1923.

H. P. WIENS

TIRE TIGHTENER

Filed March 8, 1923

Inventor
Herman P. Wiens

By Jacobi & Jacobi
Attorneys

Oct. 16, 1923.
H. P. WIENS
TIRE TIGHTENER
Filed March 8, 1923
1,470,791
2 Sheets-Sheet 2
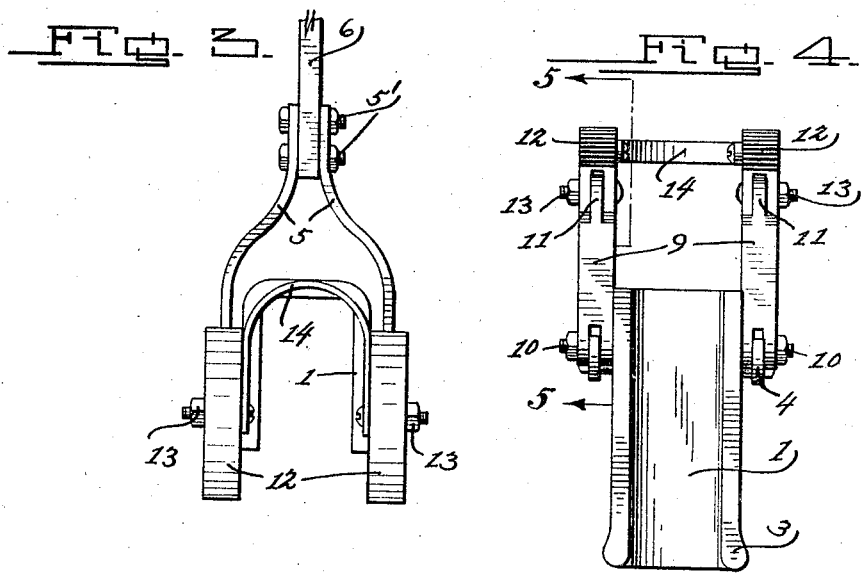
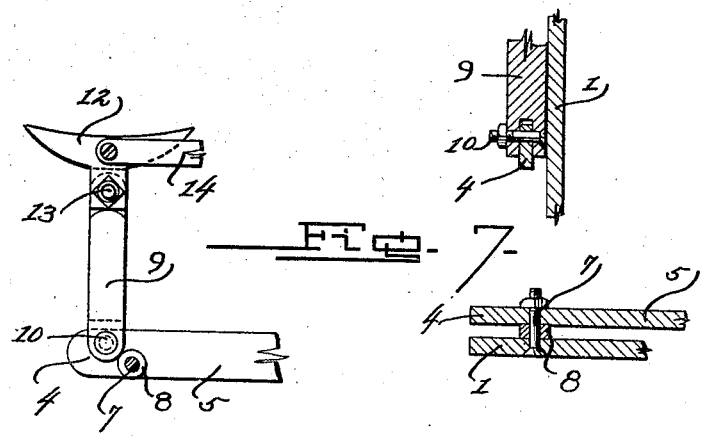
Inventor
Herman P. Wiens
By Jacobi & Jacobi
Attorneys Patented Oct. 16, 1923.

1,470,791

UNITED STATES PATENT OFFICE.

HERMAN P. WIENS, OF YORK, NEBRASKA.

TIRE TIGHTENER.

Application filed March 8, 1923. Serial No. 623,783.

*To all whom it may concern:*

Be it known that HERMAN P. WIENS, a citizen of the United States, residing at York, in the county of York and State of Nebraska, has invented certain new and useful Improvements in Tire Tighteners, of which the following is a specification.

This invention relates to a tire tightener and has for its principal object to provide a device that can be readily adjusted and applied to wheels of various sizes, and easily operated by any person to tighten the tire or a wheel by raising the felly and placing suitable shims or washers on the tenons of the spokes.

Another important object of the invention is to provide a tire tightener of the above mentioned character, which is adapted to be easily placed in position around the spoke of a wheel and adapted to rest upon the hub of the wheel in order to facilitate the proper operation of the tire tightener when in use.

A still further object of the invention is to provide a tire tightener of the above mentioned character, which is simple in construction, inexpensive, strong, durable and further well adapted for the purpose for which it is designated.

A still further object of the invention is to provide a tire tightener which may not only be used for raising the felly of the wheel from the spokes but may also be used for various other lifting purposes such as raising the wheel off of the ground whenever the occasion necessitates.

Other objects and advantages of this invention will become apparent during the course of the following description.

In the accompanying drawings forming a part of this specification and in which like numerals designate like parts throughout the same:—

Figure 3 is a top plan view of the tire tightener.

Figure 4 is a rear elevation of my tire tightener.

Figure 5 is a section taken on line 5—5 of Fig. 4.

Figure 6 is a section taken on line 6—6 of Fig. 2.

Figure 7 is a section taken on line 7—7 of Fig. 2.

Figure 1:
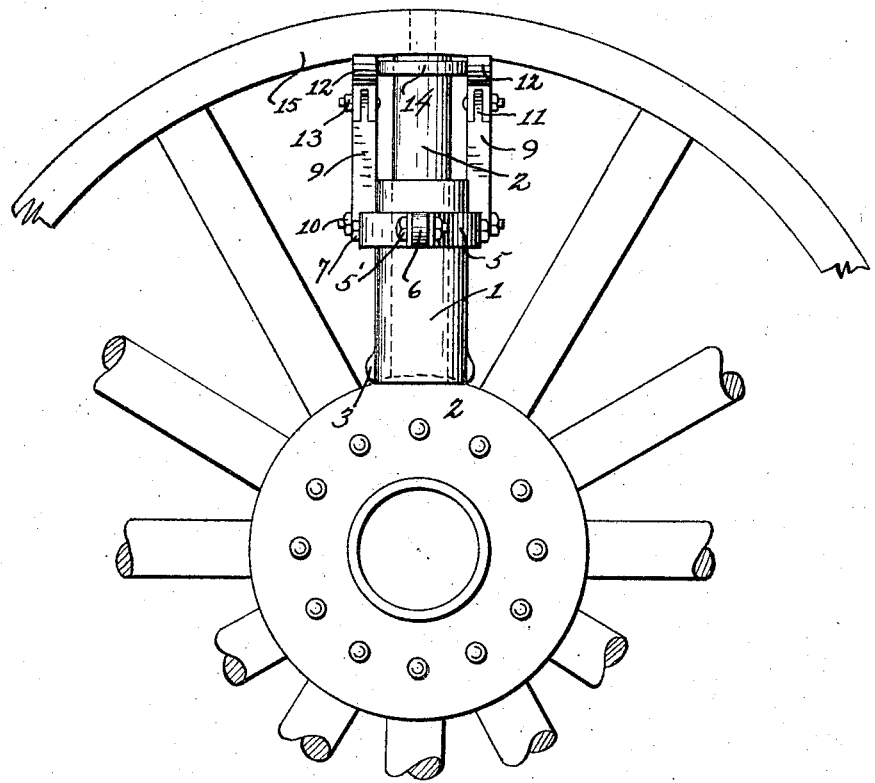
Figure 1 is a front elevation showing my improved tire tightener in position upon a wheel.
Figure 2:
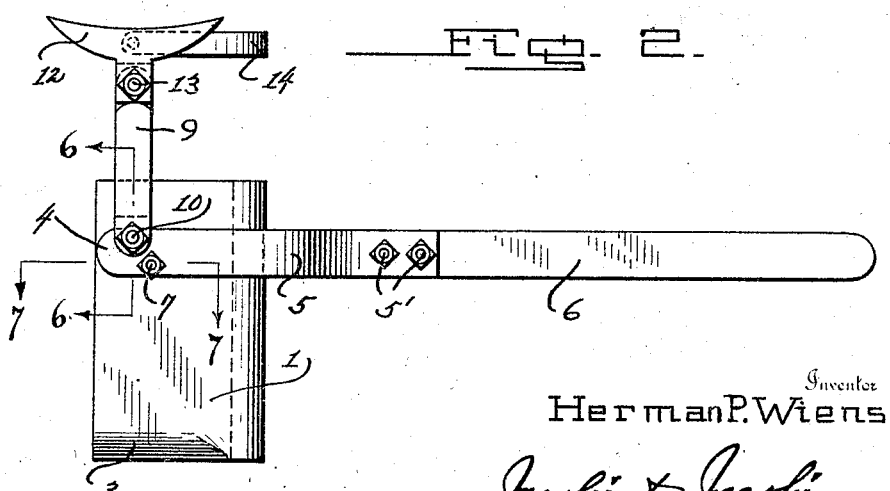
Figure 2 is a side elevation of the same.

In the drawings wherein for the purpose of illustration is shown the preferred embodiment of my invention, the numeral 1 designates a substantially U-shaped sleeve which is of a suitable length and this sleeve is adapted to be so placed in position on the wheel as to have the same enclosing a spoke of the wheel and the base of this U-shaped sleeve is adapted to rest upon the hub 2 of the wheel in the manner as shown in the drawings. The base of the U-shaped sleeve 1 may be enlarged as shown at 3 in the drawings to provide an enlarged surface for engagement with the hub of the wheel upon which my sleeve is intended to rest.

Pivotally mounted on the side of the U-shaped sleeve 1 are the ends 4 of a yoke 5 the opposite end of which is connected or fastened by any suitable fastening means such as designated at 5′ to a lever 6. The ends 4 of the yoke member are pivoted adjacent their outer ends to the sides of the U-shaped sleeve 1 and are supported in such pivotal position by means of the transverse pins 7. Suitable washers 8 are disposed upon the transverse pins 7 and between the ends 4 of the yoke and the sides of the sleeve 1 for the purposes well known in the art.

A pair of arms 9 of similar construction have their lower ends bifurcated as more clearly shown in the drawings and these bifurcated ends of the arms 9 are adapted to straddle the upper portions of the ends 4 of the yoke member and the transverse pin 10 is adapted to extend through the bifurcated ends of the arms 9 and the ends 4 of the yoke member at a point adjacent the pivotal means of the yoke member upon the sleeve 1 to provide a pivot 4 in the arms 9 upon the ends 4 of the yoke member.

The upper ends of these arms 9 are provided with projections 11 and adapted to be received upon each of these projections 11 is a head 12. The head 12 which has its lower portion bifurcated so as to permit the same to be placed upon the projection 11 of each arm 9 is also pivotally supported upon the projection 11 by means of the transverse pin 13. The heads 12 which are carried by the upper ends of the arms 9 have their upper portions provided with extended bearing surfaces for the purpose to be hereinafter more fully described. A suitable brace 14 is fastened at its respective ends to the head 12 for the purpose of maintaining the same in proper position so that the same are moved simultaneously, when in use.

In the practical operation of my invention, my tire tightener is placed in position on the wheel in such a manner that the sleeve 1 encloses the spoke of the wheel and the base 3 of the sleeve 1 is adapted to rest upon the hub 2 in the manner above described. The arms 9 and the lever 6 are then operated so as to bring the heads 12 carried by the upper ends of the arms 9 into engagement with the underside of the wheel felly 15. When in this position the lever is in a horizontal position and upon swinging the lever in a downward position the arms 9 and the heads 12 carried thereby will be caused to move in an upward position and thereby raise the tire or wheel felly off of the tenons of the spokes 2 sufficiently to enable the insertion of a suitable washer around the tenon so that the tire may be tightened upon the wheel. After the washers have been placed upon the tenons of the spokes the lever 6 is released and the heads 12 will be caused to move in a downward position and away from the wheel felly and thereby permit the felly to swing back upon the tenons and the washers on the spokes and thereby increasing the circumference of the felly and the tightening of the tire at the same time.

It will thus be seen from the foregoing description that a tire tightener has been provided wherein the same may be easily and quickly placed in position upon a wheel for the purpose as above designated and will efficiently perform its various functions.

The simplicity of my tire tightener further renders it very easy to operate and does not necessitate the adjustment of various parts and can be furthermore obtained at a minimum cost.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

1. A tire tightener of the class described including a U-shaped sleeve adapted to enclose a spoke of a wheel and having its base resting on the hub of the wheel, a lever having a yoke at one end, the ends of said yoke being pivotally mounted on the sides of said sleeve, arms pivotally mounted on said ends and extending upwardly therefrom, head members carried by the upper ends of said arms and adapted to engage the underside of the felly of said wheel, and a brace connecting said head for moving the same simultaneously.

2. A tire tightener of the class described including a U-shaped sleeve adapted to enclose a spoke of a wheel and having its base adapted to rest on the hub of said wheel, a lever provided with a yoke at one end, the ends of said yoke being pivoted to the sides of said sleeve, an arm having its lower end bifurcated and straddling each of the ends of said yoke, a transverse pin extending through each of the bifurcated ends and yoke ends for pivotally mounting said arms on said yoke, head members carried by the upper end of said arms and adapted to engage the underside of the felly of said wheel, and a brace between said end members.

3. A tire tightener of the class described including a U-shaped sleeve adapted to enclose a spoke of a wheel and having its base adapted to rest on the hub of said wheel, a yoke lever pivoted to each side of said sleeve, arms carried by said yoked ends of said lever, and means on the upper ends of said arms for engagement with the felly of said wheel.

In testimony whereof I affix my signature.

HERMAN P. WIENS.